Patented Dec. 18, 1951

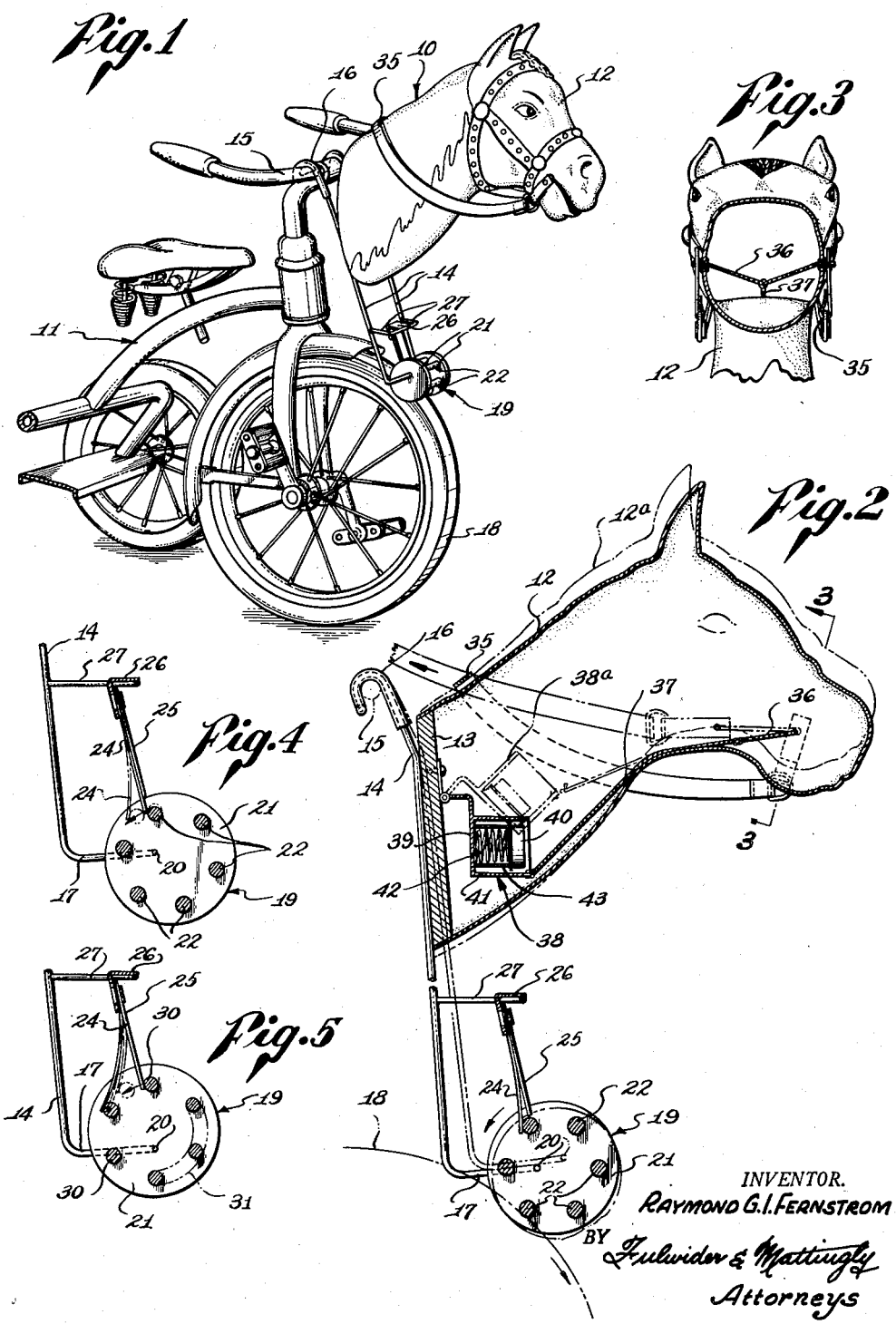

2,578,682

UNITED STATES PATENT OFFICE 2,578,682

HOBBYHORSE ATTACHMENT FOR BICYCLES AND TRICYCLES

Raymond G. I. Fernstrom, Los Angeles, Calif.

Application September 25, 1950, Serial No. 186,507

15 Claims. (Cl. 280—1.14)

My invention relates generally to hobby horses and the like amusement devices, and more particularly, to an attachment for children's bicycles and tricycles by which such vehicles can be converted to simulate a horse or other riding animal.

Children's vehicles which are constructed in the shape of a horse are, of course, well-known. One difficulty with such toys is, however, that as the child grows older, he may wish to discard his hobby horse mount for a more conventional vehicle. Also, the child may, as children do, tire of the particular size, shape and other characteristics of his hobby horse, in which case the toy falls into disuse.

Bicycles and tricycles, on the other hand, usually have a much longer life, and often are used through several successive childhoods.

Bearing in mind the foregoing considerations, it is a major object of the present invention to provide an attachment for bicycles, tricycles, and like vehicles having a dirigible front wheel by which such vehicles can be converted into one having all of the characteristics of a hobby horse or back into a conventional vehicle.

It is another object of the invention to provide a horse simulating structure in which the head of the animal is moved in a realistic and life-like manner as the vehicle to which it is attached is propelled along the ground.

Still another object of the invention is to provide means in the hobby horse combination of the class described for producing lifelike hoof beat sound to accompanying movement of the device.

It is a still further object of the invention to provide means in a hobby horse of the class described for controlling the head portion by means of conventionally placed reins so as to produce rearing movement of the head and also to produce lifelike sound such as neighing and the like.

The foregoing and additional objects and advantages of the invention will be apparent from a consideration of the following detailed description of one embodiment thereof, such consideration being given likewise to the attached drawings, wherein:

Figure 1 is a perspective view of an attachment embodying the present invention shown secured to a child's tricycle, a portion of the latter being broken away to save space in the drawing;

Figure 2 is an enlarged medial section taken on a vertical plane through the attachment shown in Figure 1;

Figure 3 is an oblique section taken on the line 3–3 in Figure 2; and

Figures 4 and 5 are successive views of a portion of Figure 2 illustrating the advancing movement of a noise producing element therein.

In the drawings, I have designated the entire attachment by the reference character 10, and a child's tricycle to which it is attached, by the reference character 11. As can be seen best in Figure 2, a hollow simulated horse's head 12 constructed of molded plastic, papier-mâché, or similar material, is mounted to a base of neck section 13 which may be of the same material as the head 12 or may be constructed of wood.

An attaching framework is secured to the base 13 and comprises a pair of substantially upright bars 14 bent over and joined at their upper ends to form a hook-like member which is adapted to pass over the horizontal handlebars 15 of the tricycle 11 to pivotally hang the head 12 thereon. A sleeve 16 of plastic material, rubber, felt, or the like, is positioned over the hook-shaped portion of the upper ends of members 14 so as to permit rattling these members against the handlebars 15. The fit of the hook portion of the bars 14 is sufficiently free that the entire attachment 10 may swing forwardly and rearwardly about a transverse axis established by the handlebars 15.

The lower ends of the frame members 14 are bent to form forwardly extending arms 17 which are turned inwardly to form opposed pivots 20 on which a spool-shaped roller 19 is rotatably mounted. It will be noted that the pivots 20 are eccentrically located with respect to the center of the roller 19 for reasons which will be described later.

The roller 19 is comprised of a pair of circular end plates 21 which are interconnected by peripherally arranged transverse rungs 22. As can be seen best in Figure 1, the spool 19 is positioned and adapted to roll, cam fashion, against the periphery of the front wheel 18 of the tricycle. As the tricycle progresses forwardly, the spool 19 is rotated (counterclockwise in Figure 2) by reason of the frictional contact of the gear-tooth-like rungs 22 with the wheel 18. Due to the aforementioned eccentric positioning of the pivotal axis 20, such axis is oscillated forwardly and rearwardly as the spool 19 rotates. This action in turn rocks the frame comprised of the members 14, forwardly and rearwardly about the handlebars 15 upon which it is hooked. Since the head 12 is supported on the frame members 14, the rocking motion of the latter causes the head to rear upwardly with each rotation of the roller 19. The alternate limits of this rearing or nodding movement of the head are indicated in Figure 2 by the full and phantom outlines therein, the latter being indicated by the reference character 12a.

The roller 19 serves the additional purpose of providing a lifelike hoofbeat sound as it rotates. To this end, a pair of reeds or clappers 24 and 25 are positioned to be grazingly engaged by the rungs 22 as the latter are moved rearwardly by the rotation of the roller 19. The clappers 24 and 25 are constructed of resilient material and are supported in face-to-face relationship by a mounting bracket 26, the latter being supported on forwardly extending arms 27 welded or otherwise secured to the upright portion 14. It will be noted that the rearmost clapper 24 is somewhat longer and therefore extends somewhat lower than the foremost clapper 25. Thus the eccentric rotary motion of the roller 19 causes the rungs to engage only one of the clappers 24 during part of the rotation, and to engage both thereof during the rest of the rotation. Thus, the clappers 24—25 are caused to snap together in a non-synchronous relation to the passage of the rungs 22. During part of the rotation, only the rearmost clapper 24 is engaged by the rungs 22 (Figure 4) while during the rest of the rotation, both clappers are engaged (Figure 5). It is apparent that, in every case, the forward clapper 25 is released first and the rearward clapper last so that they are always snapped together but that the time intervals between successive snaps are not uniform but vary rhythmically with the rotation of the eccentric roller 19.

The noise produced by the illustrated embodiment closely simulates the hoofbeats of a galloping horse. Further variations in the sound so as to simulate other gaits may be produced by altering the grouping of the rungs 22. For example, one arrangement that has been found effective is to omit two alternate rungs, as for example those indicated by the reference character 30 in Figure 5, thus leaving four rungs, three of which are grouped together and one of which is diametrically opposite the center of the group.

Another effective arrangement is to join together three successive rungs whereby to form a single arcuate inter-connecting member between the side plates 21 as shown in phantom line in Figure 5, and indicated by the reference character 31.

The horse's head 12 is provided with reins 35 so that the child operating the tricycle 11 may if desired pull on the reins and cause the head 12 to rear independently of the action of the roller 19. The reins 35 are connected at their forward ends to an internal cord 36 which passes through the mouth of the horse's head 12 approximately at the position of the usual bit. Cord 36 is somewhat longer than necessary to pass across the head 12 and at its center a second or connecting cord 37 is attached thereto, the rearward end of the connecting cord 37 being attached to a pivotally supported neigh-simulating noise maker 38.

The noise maker 38 is mounted on a bracket 39, the upper end of which is hingedly attached to the mounting plate 13, as indicated in Figure 2. Forward tension on the connecting cord 37 raises the noise maker 38 to the position 38a shown in phantom line in Figure 2. The noise maker 38 is gravity-operated having a weight 40 loosely supported in a tubular guide 41 and normally held at the outer end of the guide 41 by a light compression spring 42. Surrounding the compression spring 42 is an accordion-like bellows 43 which when collapsed operates a conventional vibrating reed or whistle (unshown) of the type commonly employed in sound producing toys.

Thus, when the noise maker 38 is rocked upwardly to the position 38a, the weight 40 presses the spring 42 and collapses the bellows 43, causing a sound simulating the neigh of a horse. Pneumatically operated sound producing units of the whistle or reed type are well known in the art, and it is therefore unnecessary to describe the same in detail here. Suffice it to say that devices of this type are available which will produce a sound regardless of whether air is being expelled therethrough or inducted therethrough. If the latter type of unit is employed, the sound will be produced when the unit 38 is raised and another sound when the same is allowed to drop back to the full line position shown in Figure 2, and the spring 42 forces the weight 40 out to its initial position drawing air into the bellows 43.

It will be noted that the unit is adapted for attachment to a relatively wide range of sizes of tricycle 11 and also may be attached to a bicycle in the same manner shown in Figure 1. A difference in the size of the wheel 18 results only in the roller 19 falling at a slightly different point in the periphery thereof and in a slight change in the attitude of the head 12. Furthermore, it is possible by bending the uprights 14 at a point immediately below their attachment to the plate 13 to change the attitude of the head 12 for any particular installation. The entire unitary attachment 10 is quickly and easily removed by simply lifting the hook portion of the bars 14 from the handlebars 15, no bolts or other securing means being required.

While the attachment shown and described herein is fully capable of achieving the objects and providing the advantages hereinbefore stated, it will be realized that it is capable of further modification without departure from the spirit of the invention. For this reason, I do not mean to be limited to the form shown and described but rather to the scope of the appended claims.

I claim:

1. An accessory attachment for a child's wheeled vehicle comprising in combination: an animal simulating body portion; frame means to pivotally support said body portion on a portion of said vehicle, said body portion being horizontally displaced from a vertical plane through said pivotal support whereby to gravity bias said frame means and body portion for swinging movement about said pivotal support in a given direction; and a rotary cam journaled in said frame means and positioned and adapted to frictionally engage a concentric surface of a wheel of said vehicle to drive said cam whereby to move said body portion in response to driven rotation of said cam, said cam being urged into frictional engagement with said wheel by said gravity bias.

2. An accessory attachment for a child's wheeled vehicle comprising in combination: an animal simulating body portion; frame means secured to said body portion and adapted to pivotally support the same on the forepart of said vehicle; a pair of horizontally aligned journal bearing members in said frame; and an eccentric roller supported for rotation on said bearing members positioned and adapted to frictionally and drivingly engage the concentric periphery of a wheel of said vehicle whereby to move said body portion in response to rotation of said roller driven by rotation of said wheel.

3. An attachment for a child's wheeled vehicle comprising in combination: an animal simulating body portion; frame means to pivotally support said body portion on a horizontal member in said vehicle; a rotary cam journaled in said frame means and positioned and adapted to drivingly engage a concentric rotary surface of a wheel of said vehicle whereby to move said body portion in response to rotation of said wheel, said cam having spaced peripheral abutments; and an animal-simulating noise maker supported on said frame and positioned for intermittent engagement by said abutments to simulate animal sounds in response to rotation of said vehicle wheel.

4. An attachment for a child's wheeled vehicle comprising in combination: an animal simulating body portion; frame means to pivotally support said body portion on a horizontal member in said vehicle; rotary eccentric cam means movably supported in said frame means and positioned and adapted to drivingly engage a concentric surface of a wheel of said vehicle whereby to move said body portion in response to rotation of said wheel; and independent means under control of a passenger on said vehicle to rock said body portion about an axis defined by said horizontal member.

5. An attachment for a child's wheeled vehicle comprising in combination: an animal simulating body portion; frame means to pivotally support said body portion on a horizontal member in said vehicle; roller means rotatably supported in said frame means positioned and adapted to frictionally engage a wheel of said vehicle whereby to be rotated in response to movement of said vehicle, said roller means having a plurality of peripherally arranged tooth-like members; and a percussive noise maker mounted in said frame and positioned and adapted to be sequentially struck by said tooth-like members when said roller is rotated, whereby to simulate animal sounds in accompaniment to movement of said vehicle.

6. The construction of claim 5 further characterized in that the circumferential spacing between said tooth-like members is unequal whereby to effect a rhythmic variation in said animal sounds in response to uniform movement of said vehicle.

7. The construction of claim 5 further characterized in that said roller means is eccentrically mounted with respect to the surface thereof engaging said vehicle wheel whereby to rock said frame means about said horizontal member in response to movement of said vehicle.

8. The construction of claim 5 further characterized in that said tooth-like members are eccentrically arranged about the axis of rotation of said roller means whereby to cyclically vary the point on said percussive noise maker engaged by said tooth members to produce a rhythmic variation in said sound in response to uniform movement of said vehicle.

9. An attachment for a child's wheeled vehicle comprising in combination: an animal simulating body portion; frame means to pivotally support said body portion on a horizontal member in said vehicle; cam means movably supported in said frame means and positioned and adapted to engage a concentric wheel surface of said vehicle whereby to move said body portion in response to rotary movement of said wheel surface; independent means under control of a passenger on said vehicle to rock said body portion about an axis defined by said horizontal member; and a gravity actuated noise maker positioned in said body portion and adapted for operation in response to said rocking movement.

10. In combination in a vehicle of the type having a dirigible wheel with a concentric surface and a horizontal handlebar thereabove: a frame having an upper hook member removably hooked over said handlebar to pendantly and pivotally support said frame for swinging movement about an axis defined by said handlebar and substantially in the plane of said wheel, said frame having transverse aligned pivot bearing members formed therein adjacent the lower end of said frame; a simulated animal head secured to said frame and projecting forwardly therefrom whereby to gravity bias said frame to swing rearwardly about said axis; and an eccentric roller rotatably supported on said bearing members and urged into frictional engagement with said concentric wheel surface by said bias to effect rocking movement of said frame and head about said horizontal axis and in response to rotation of said wheel.

11. A hoofbeat simulating attachment for vehicles comprising in combination: a frame; a rotary member rotatably mounted in said frame and adapted for driving connection to a vehicle to be rotated by progressive movement thereof, said member having a plurality of gear-tooth-like members circumferentially arranged thereon; and a pair of flat resilient clappers positioned in face-to-face relationship whereby to clap together when bent and released, said clappers being mounted on said frame and extending into the path of movement of said tooth members to be successively engaged thereby as said rotary member rotates whereby to be successively bent and released as said teeth engage and pass the same.

12. The construction of claim 11 further characterized in that said clappers are elongate and one is longer than the other whereby said clappers are successively separated and allowed to clap together as said teeth engage and pass the same.

13. The construction of claim 11 further characterized in that said gear tooth members are eccentrically arranged around the rotary axis of said rotary member.

14. The construction of claim 11 further characterized in that some of the spaces between said tooth members are different from other spaces whereby to effect a rhythmic variation in the sequence of said clapper engagements.

15. An accessory for a child's wheeled vehicle comprising in combination: an animal simulating body portion; frame means secured to said body portion to removably attach the same to said vehicle, said frame means having pivot bearing members therein to permit oscillatory movement of said body portion with respect to said vehicle when attached as aforesaid; and means to oscillate said body portion in response to movement of said vehicle which oscillating means includes a rotary member journaled in said frame means and having a cam surface engageable with a part of said vehicle when said body portion is attached as aforesaid, whereby rotation of said rotary member oscillates said body portion, said oscillating means being adapted and positioned in said frame for driving engagement with a concentric surface of revolution of a wheel in said vehicle when said body portion is attached as aforesaid whereby to drive said rotary member when said vehicle is moved.

RAYMOND G. I. FERNSTROM.

REFERENCES CITED

The following references are of record in the file of this patent:

UNITED STATES PATENTS

| Number | Name | Date |
|---|---|---|
| 507,851 | Shetter | Oct. 31, 1893 |
| 569,158 | Arnold | Oct. 13, 1896 |
| 597,829 | Heilborn | Jan. 25, 1898 |
| 650,895 | Faherty | June 5, 1900 |
| 692,383 | Tarzian | Feb. 4, 1902 |
| 1,302,335 | Elzey | Apr. 29, 1919 |
| 1,372,351 | Hurlstone-Jones | Mar. 22, 1921 |
| 1,414,950 | Hoge | May 2, 1922 |
| 2,107,506 | Roe et al. | Feb. 8, 1938 |
| 2,436,886 | Gowland | Mar. 2, 1948 |
| 2,509,805 | Briggs | May 30, 1950 |

FOREIGN PATENTS

| Number | Country | Date |
|---|---|---|
| 615,397 | France | Oct. 11, 1926 |

OTHER REFERENCES

Publication: American Bicyclist, August 1949, page 39, issue No. 8, vol. No. 70, "Shelby Donald Duck Bike."